J. Brown.
Stench Trap.
Nº 97,033. Patented Nov. 23, 1869.
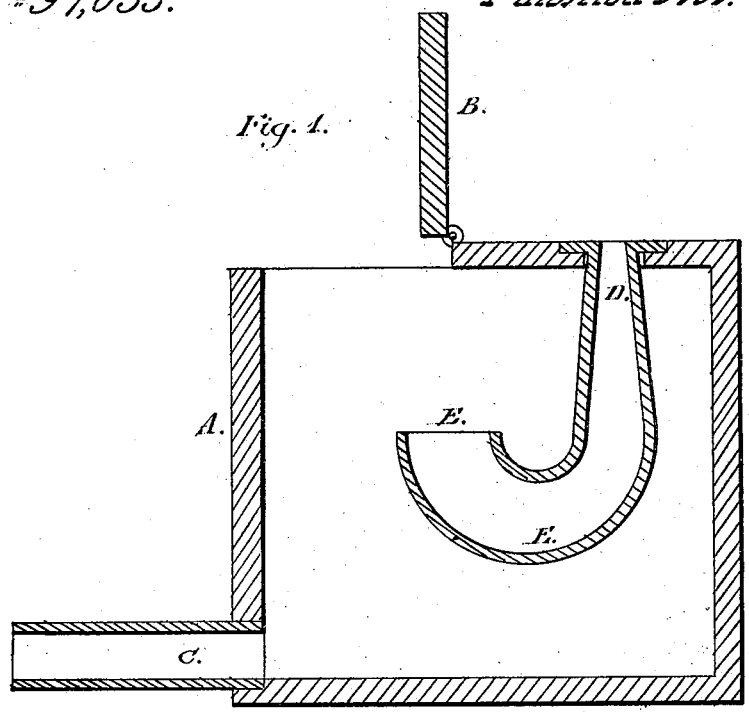
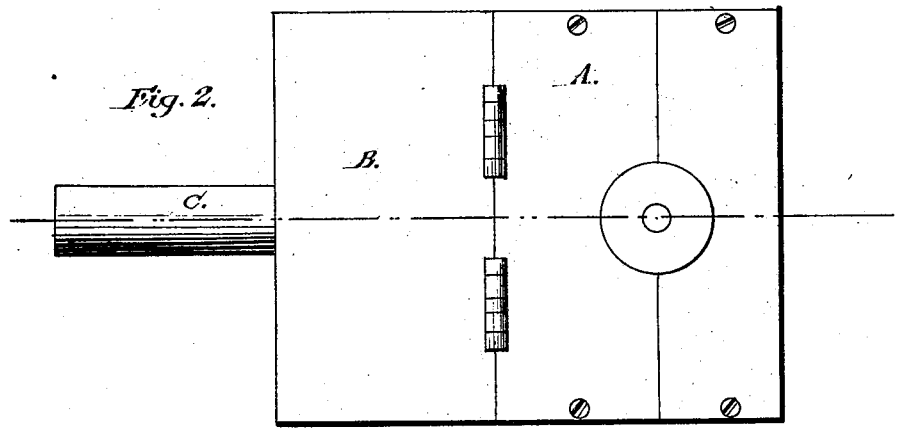
WITNESSES:
David R. Smith
C. W. Smith
INVENTOR:
Jesse Brown.

UNITED STATES PATENT OFFICE.

JESSE BROWN, OF SAN FRANCISCO, CALIFORNIA.

IMPROVEMENT IN STENCH-TRAPS.

Specification forming part of Letters Patent No. 97,033, dated November 23, 1869.

*To all whom it may concern:*

Be it known that I, JESSE BROWN, of San Francisco, in the county of San Francisco and State of California, have invented certain new and useful Improvements in Stench-Traps; and I do hereby declare that the following is a full and exact description of the same, reference being had to the accompanying drawings, and to the letters of reference marked thereon.

The nature of my invention is to provide a stench-trap simple in its construction and effectual for the purpose of preventing the effluvia from returning to the building by way of the eduction-pipe.

My invention consists in the employment of a small box, in which is placed the pipe, with its lower end curved upward. The upper end is made smaller in diameter than the lower end, so that the débris which enters through the smaller opening or portion of the pipe will be forced out by the action of the water from the mouth, and the pipe not become choked, while the curvature or trap is constantly filled with water to the base of the vertical line of the pipe, so that no offluvia can return. The upper end of the pipe extends through the top of the box or tank, and to it the sink-pipe may be connected.

Referring to the accompanying drawings for a better description of my device, Figure 1 is a sectional elevation on the line $xx$, Fig. 2. Fig. 2 is a plan.

The box or tank A is provided with a hinged cover, B, so that easy access may be had to the trap to remove any matter that might accumulate to retard the free passage through the pipe.

At the side of the tank or through the bottom, so as to drain it, is placed a pipe, C, which may lead to the main sewer.

The pipe D is attached to the cover of the box, through which it passes, and has a sufficient-sized bore to admit the end of the sink or water-closet pipe. This pipe gradually expands in diameter to the mouth of the trap E, and is curved upward in a manner similar to that of the bowl of a tobacco-pipe, so that when water is admitted it will remain, and if a sufficient quantity is admitted it will always fill the bowl on a level with the mouth of the trap, and effectually prevent the return of foul air from the box, sewer, or cesspool.

It will here be observed that only a small quantity of water is required to trap by this device, and its simplicity of construction and effectual working will readily commend it to all householders.

In places where crockery pipes can be formed cheaper than metal the trap may be made of clay, after the manner of drain-tile, and at a small cost. If desired, the box and trap may be cast in one piece.

Having thus described my invention, what I claim, and desire to secure by Letters Patent, is—

The trap described, consisting of the box A, with the cover B, trapping-pipe D, and pipe E, when combined as described, for the purpose set forth.

In witness whereof I have hereunto set my hand and seal.

JESSE BROWN. [L. S.]

Witnesses:
   C. W. M. SMITH,
   ISAAC T. MILLIKEN.